United States Patent
Fleureau et al.

(10) Patent No.: US 11,721,044 B2
(45) Date of Patent: Aug. 8, 2023

(54) METHOD AND APPARATUS FOR DECODING THREE-DIMENSIONAL SCENES

(71) Applicant: InterDigital VC Holdings, Inc., Wilmington, DE (US)

(72) Inventors: Julien Fleureau, Rennes (FR); Gerard Briand, Ploufragan (FR); Renaud Dore, Rennes (FR)

(73) Assignee: INTERDIGITAL VC HOLDINGS, INC., Wilmington, DE (US)

(*) Notice: Subject to any disclaimer, the term of this patent is extended or adjusted under 35 U.S.C. 154(b) by 57 days.

(21) Appl. No.: 17/612,808

(22) PCT Filed: May 26, 2020

(86) PCT No.: PCT/US2020/034549
§ 371 (c)(1),
(2) Date: Nov. 19, 2021

(87) PCT Pub. No.: WO2020/243089
PCT Pub. Date: Dec. 3, 2020

(65) Prior Publication Data
US 2022/0254068 A1 Aug. 11, 2022

(30) Foreign Application Priority Data
May 28, 2019 (EP) .................................... 19305676

(51) Int. Cl.
*G06T 9/00* (2006.01)
*G06T 15/20* (2011.01)
*G06T 15/50* (2011.01)

(52) U.S. Cl.
CPC ................ *G06T 9/00* (2013.01); *G06T 15/20* (2013.01); *G06T 15/503* (2013.01)

(58) Field of Classification Search
None
See application file for complete search history.

(56) References Cited

U.S. PATENT DOCUMENTS 9,369,689 B1* 6/2016 Tran ...................... H04N 13/239
2019/0108654 A1* 4/2019 Lasserre ................. G06T 9/001

FOREIGN PATENT DOCUMENTS

EP 3467785 A1 4/2019
WO WO 2014044569 A1 3/2014

OTHER PUBLICATIONS

Salahieh et al., "Test Model for Immersive Video", International Organisation for Standardisation, ISO/IEC JTC 1/SC 29/WG 11, Document: N18470, Geneva, Switzerland, Mar. 2019, 27 pages.

* cited by examiner

*Primary Examiner* — Nurun Flora
(74) *Attorney, Agent, or Firm* — Volpe Koenig

(57) ABSTRACT

Generating an image from a source image can involve encoding a projection of a part of a three-dimensional scene. Pixels of a source image comprise a depth and a color attribute. Pixels of a source image are de-projected as colored point cloud. A de-projected point in a 3D space has the color attribute of the pixel that it has been de-projected from. Also, a score is attributed to the generated point according to a local depth gradient and/or a local color gradient of the pixel it comes from, the lower the gradient, the higher the score. The generated point cloud is captured by a virtual camera for rendering on a display device. The point cloud is projected onto the viewport image by blending color of points projected on a same pixel, the blending being weighted by the scores of these points.

15 Claims, 3 Drawing Sheets

METHOD AND APPARATUS FOR DECODING THREE-DIMENSIONAL SCENES

CROSS REFERENCE TO RELATED APPLICATIONS

This application is a U.S. National Stage Application under 35 U.S.C. 371 of International Patent Application No. PCT/US2020/034549, filed May 26, 2020, which is incorporated herein by reference in its entirety.

This application claims the benefit of European Patent Application No. 19305676, filed May 28, 2019, which is incorporated herein by reference in its entirety.

TECHNICAL FIELD

The present principles generally relate to decoding of a three-dimensional scene comprising three-dimensional (3D) objects. Particularly, but not exclusively, the technical field of the present principles is related to decoding of depth and texture image data obtained by projections of points of the 3D scene for representing geometry and color of the three-dimensional scene.

BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

A point cloud is a set of points usually intended to represent the external surface of a 3D object but also more complex geometries like hair or fur that may not be represented efficiently by other data format like meshes. Each point of a point cloud is often defined by a 3D spatial location (X, Y, and Z coordinates in an orthogonal frame of reference of the 3D space or angles $\rho$, $\varphi$ and distance d in a radial frame of reference of the 3D space) and possibly by other associated attributes such as color, represented in the RGB or YUV color space for example, a transparency, a reflectance, a normal vector, etc. Point clouds may be static or dynamic depending on whether the cloud evolves with respect to time. It should be noticed that in case of a dynamic point cloud, the number of points is not constant but, on the contrary, generally evolves with time. A dynamic point cloud is thus a time-ordered sequence of sets of points.

Virtual Reality (VR) and immersive worlds have become a hot topic recently and foreseen by many as the future of two-dimensional (2D) flat video. The basic idea is to immerse the viewer in an environment all round him by opposition to standard TV where he can only look at the virtual world in front of him. There are several gradations in the immersivity depending on the freedom of the viewer in the environment. Point clouds, especially colored point clouds, are a good format candidate to distribute VR worlds and volumetric video. They may be static or dynamic and are typically of averaged size (a few millions of points at a time).

Well-known approaches project a colored point cloud representing the geometry and colors of 3D objects onto the surfaces in the 3D environment, for example onto the faces of a cube encompassing the 3D objects, to obtain videos on texture and depth, and code the texture and depth videos using a legacy encoder such as 3D-HEVC.

At the decoder, the picture and depth images (a video is a sequence of images) are inverse projected to re-generate a colored point cloud (or a sequence of colored point clouds). The inverse projection is performed according to information representing the projections mapping associated to surfaces onto which the original colored point cloud has been projected. The representation of the geometry and color of a point cloud with projection images introduce imprecisions on the point coordinates and color because of the avoidable discretization due to the images rasterization and the non-lossless compression methods. When re-generating the colored point cloud from these images, a same point in the original colored point cloud may be inverse projected several times at distinct coordinates and/or with distinct colors. When the rebuilt colored point cloud is captured with a virtual camera that is not at the location of centers of projection of the sources images, these errors and imprecisions often lead to a ghosting effect in the viewport image. The present principles address this problem by taking advantage of the fact that a same point of the original colored point cloud may be projected several times onto several images.

SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles relate to a method for generating an image from a source image encoding a projection of a part of a three-dimensional scene, pixels of said source image comprising a depth and a color attribute. The method comprises:
  de-projecting pixels of the source image as colored point cloud. A pixel is de-projected as a point in a 3D space according to the depth attribute of the pixel. The point has the color attribute of the pixel and has a score attributed according to the local depth gradient and/or the local color gradient of the pixel that it has been generated from, the lower the gradient, the higher the score;
  projecting the built colored point cloud onto the image to generate by blending color attributes of points projected on a same pixel. The blending is a function weighted by the score attribute of these points.

According to one embodiment, the source image is decoded from a data stream. The source image may be associated in the data stream with data representative of the projection of a part of a three-dimensional scene the image has been generated with. These data are then used to de-project pixels of the source image.

According to another embodiment, the generated image is a viewport image rendered according to a location and an orientation of a virtual camera in said 3D space. This pose (i.e. location and orientation) of the virtual camera may be controlled by sensors of a head-mounted display device.

The present principles also relate to a device comprising a processor configured for implemented the above method. The present principles also relate to a non-transitory processor readable medium having stored therein instructions for causing a processor to perform the method.

BRIEF DESCRIPTION OF DRAWINGS

The present disclosure will be better understood, and other specific features and advantages will emerge upon reading the following description, the description making reference to the annexed drawings wherein.

DETAILED DESCRIPTION OF EMBODIMENTS

Figure 1:
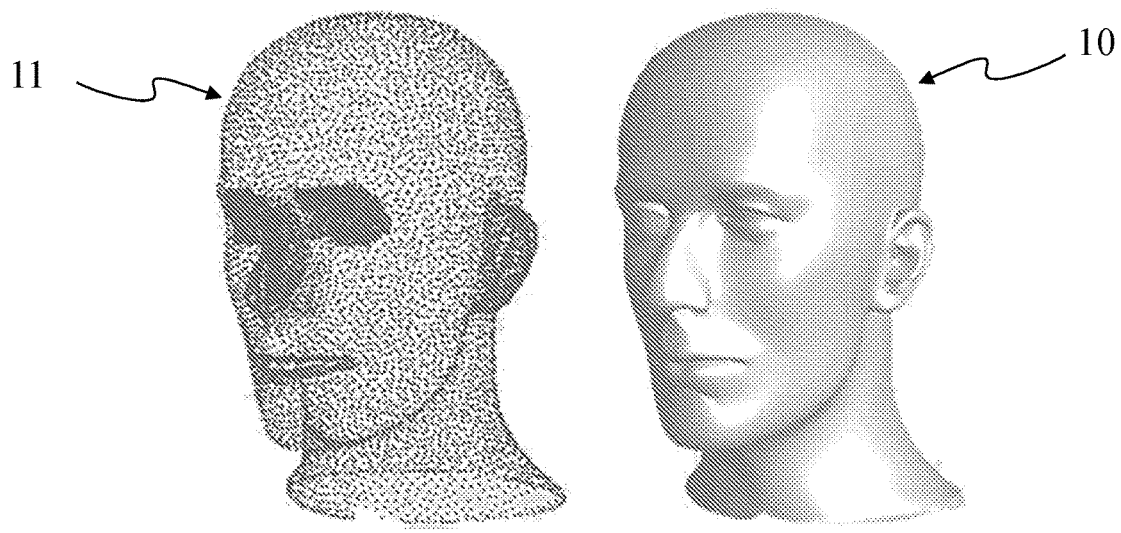
FIG. 1 shows a three-dimension (3D) model of an object and points of a point cloud corresponding to the 3D model, according to a non-limiting embodiment of the present principles.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

The present principles are described for encoding/decoding a point cloud but extends to the encoding/decoding of a sequence of point clouds because each colored point cloud of the sequence is sequentially encoded/decoded as described below. Point clouds may be colored.

In the following, an image or a map contains one or several arrays of samples (pixel values) in a specific image/video format which specifies all information relative to the pixel values of an image (or a video) and all information which may be used by a display and/or any other device to visualize and/or decode an image (or video) for example. An image comprises at least one component, in the shape of a first array of samples, usually a luminance component or a depth component, and, possibly, at least one other component, in the shape of at least one other array of samples, usually a color component. Or, equivalently, the same information may also be represented by a set of arrays of color samples, such as the tri-chromatic RGB representation.

FIG. 1 shows a three-dimension (3D) model 10 of an object and points of a point cloud 11 corresponding to 3D model 10. 3D model 10 and the point cloud 11 may for example correspond to a possible 3D representation of an object of the 3D scene comprising other objects. Model 10 may be a 3D mesh representation and points of point cloud 11 may be the vertices of the mesh. Points of point cloud 11 may also be points spread on the surface of faces of the mesh. Model 10 may also be represented as a splatted version of point cloud 11, the surface of model 10 being created by splatting the points of the point cloud 11. Model 10 may be represented by a lot of different representations such as voxels or splines. FIG. 1 illustrates the fact that a point cloud may be defined with a surface representation of a 3D object and that a surface representation of a 3D object may be generated from a point of cloud. As used herein, projecting points of a 3D object (by extension points of a 3D scene) onto an image is equivalent to projecting any representation of this 3D object, for example a point cloud, a mesh, a spline model or a voxel model.

A point cloud may be represented in memory, for instance, as a vector-based structure, wherein each point has its own coordinates in the frame of reference of a viewpoint (e.g. three-dimensional coordinates XYZ, or a solid angle and a distance (also called depth) from/to the viewpoint) and one or more attributes, also called component. An example of component is the color component that may be expressed in various color spaces, for example RGB (Red, Green and Blue) or YUV (Y being the luma component and UV two chrominance components). The point cloud is a representation of a 3D scene comprising objects. The 3D scene may be seen from a given viewpoint or a range of viewpoints. The point cloud may be obtained by many ways, e.g.:
 from a capture of a real object shot by a rig of cameras, optionally complemented by depth active sensing device;
 from a capture of a virtual/synthetic object shot by a rig of virtual cameras in a modelling tool;
 from a mix of both real and virtual objects.

Figure 2:
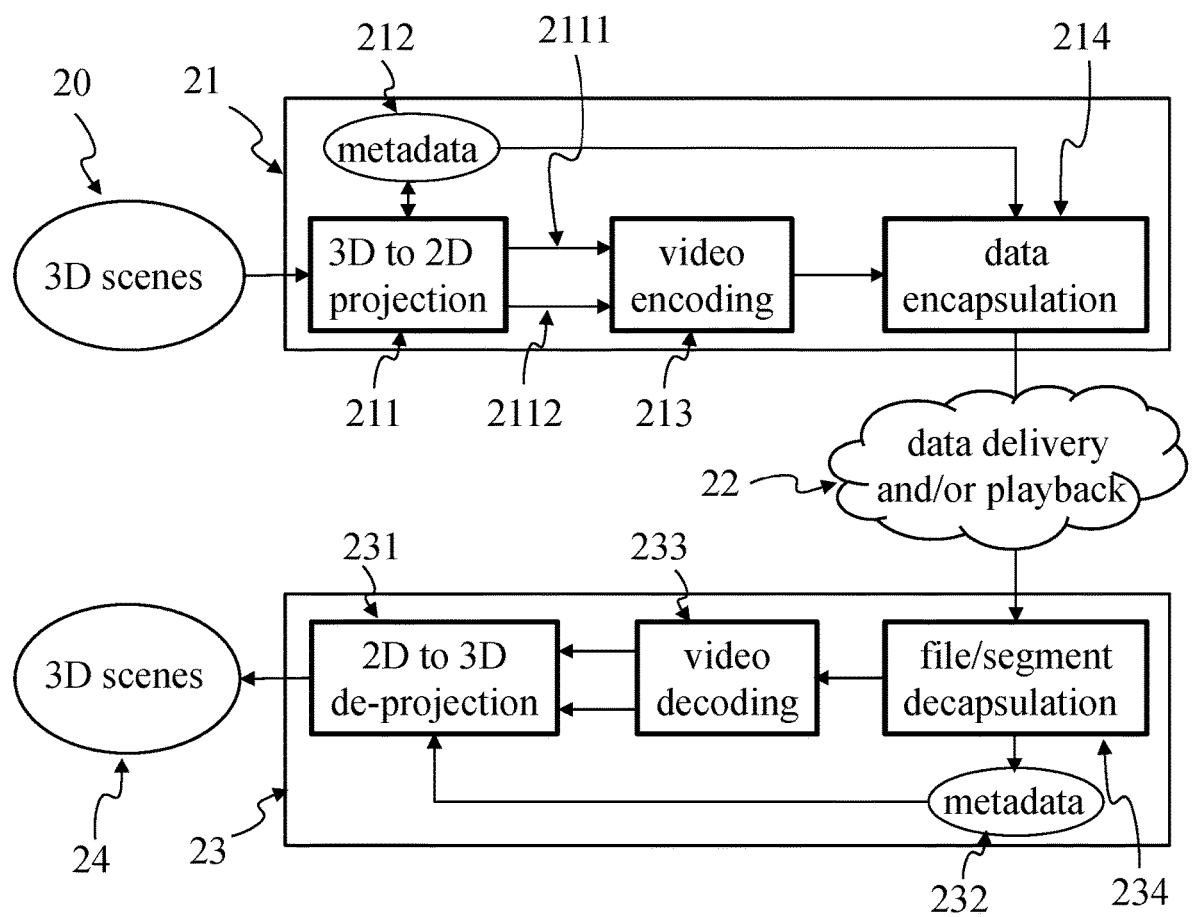
FIG. 2 shows a non-limitative example of the encoding, transmission and decoding of data representative of a sequence of 3D scenes, according to a non-limiting embodiment of the present principles.

FIG. 2 shows a non-limitative example of the encoding, transmission and decoding of data representative of a sequence of 3D scenes. The encoding format that may be, for example and at the same time, compatible for 3DoF, 3DoF+ and 6DoF decoding. It is understood in the present document that a sequence of items may be a unique item, for instance, a sequence of 3D scenes may be one 3D scene or a sequence of images may be one image.

A sequence of 3D scenes 20 is obtained. As a sequence of pictures is a 2D video, a sequence of 3D scenes is a 3D (also called volumetric) video. A sequence of 3D scenes may be provided to a volumetric video rendering device 23 for a 3DoF, 3Dof+ or 6DoF rendering and displaying.

Sequence of 3D scenes 20 is provided to an encoder 21. The encoder 21 takes one 3D scenes or a sequence of 3D scenes as input and provides a bit stream representative of the input. The bit stream may be stored in a memory 22 and/or on an electronic data medium and may be transmitted over a network 22. The bit stream representative of a sequence of 3D scenes may be read from a memory 22 and/or received from a network 22 by a decoder 23. Decoder 23 is inputted by said bit stream and provides a sequence of 3D scenes, for instance in a point cloud format.

Encoder 21 may comprise several circuits implementing several steps. In a first step, encoder 21 projects each 3D scene onto at least one 2D picture. 3D projection is any method of mapping three-dimensional points to a two-dimensional plane. As most current methods for displaying graphical data are based on planar (pixel information from several bit planes) two-dimensional media, the use of this type of projection is widespread, especially in computer graphics, engineering and drafting. Projection circuit 211 provides at least one two-dimensional frame 2111 for a 3D scene of sequence 20. Frame 2111 comprises color information and depth information representative of the 3D scene projected onto frame 2111. In a variant, color information and depth information are encoded in two separate frames 2111 and 2112.

Metadata 212 are used and updated by projection circuit 211. Metadata 212 comprise information about the projection operation (e.g. projection parameters) and about the way color and depth information is organized within frames 2111 and 2112 as described in relation to FIGS. 5 to 7.

A video encoding circuit 213 encodes sequence of frames 2111 and 2112 as a video.

Pictures of a 3D scene 2111 and 2112 (or a sequence of pictures of the 3D scene) is encoded in a stream by video encoder 213. Then video data and metadata 212 are encapsulated in a data stream by a data encapsulation circuit 214.

Encoder 213 is for example compliant with an encoder such as:
 JPEG, specification ISO/CEI 10918-1 UIT-T Recommendation T.81, https://www.itu.int/rec/T-REC-T.81/en;
 AVC, also named MPEG-4 AVC or h264. Specified in both UIT-T H.264 and ISO/CEI MPEG-4 Part 10 (ISO/CEI 14496-10), http://www.itu.int/rec/T-REC-H.264/en, HEVC (its specification is found at the ITU website, T recommendation, H series, h265, http://www.itu.int/rec/T-REC-H.265-201612-Fen);
 3D-HEVC (an extension of HEVC whose specification is found at the ITU website, T recommendation, H series, h265, http://www.itu.int/rec/T-REC-H.265-201612-I/en annex G and I);
 VP9 developed by Google; or
 AV1 (AOMedia Video 1) developed by Alliance for Open Media.

The data stream is stored in a memory that is accessible, for example through a network 22, by a decoder 23. Decoder 23 comprises different circuits implementing different steps of the decoding. Decoder 23 takes a data stream generated by an encoder 21 as an input and provides a sequence of 3D scenes 24 to be rendered and displayed by a volumetric video display device, like a Head-Mounted Device (HMD). Decoder 23 obtains the stream from a source 22. For example, source 22 belongs to a set comprising:
 a local memory, e.g. a video memory or a RAM (or Random-Access Memory), a flash memory, a ROM (or Read Only Memory), a hard disk;
 a storage interface, e.g. an interface with a mass storage, a RAM, a flash memory, a ROM, an optical disc or a magnetic support;
 a communication interface, e.g. a wireline interface (for example a bus interface, a wide area network interface, a local area network interface) or a wireless interface (such as a IEEE 802.11 interface or a Bluetooth® interface); and
 a user interface such as a Graphical User Interface enabling a user to input data.

Decoder 23 comprises a circuit 234 for extract data encoded in the data stream. Circuit 234 takes a data stream as input and provides metadata 232 corresponding to metadata 212 encoded in the stream and a two-dimensional video. The video is decoded by a video decoder 233 which provides a sequence of frames. Decoded frames comprise color and depth information. In a variant, video decoder 233 provides two sequences of frames, one comprising color information, the other comprising depth information. A circuit 231 uses metadata 232 to un-project color and depth information from decoded frames to provide a sequence of 3D scenes 24. Sequence of 3D scenes 24 corresponds to sequence of 3D scenes 20, with a possible loss of precision related to the encoding as a 2D video and to the video compression.

Video rendering device 23 displays a part of the received 3D scene in its viewport according to a view point determined by a controller, for example the Inertial Measurement Unit (IMU) of a HMD.

Figure 3:
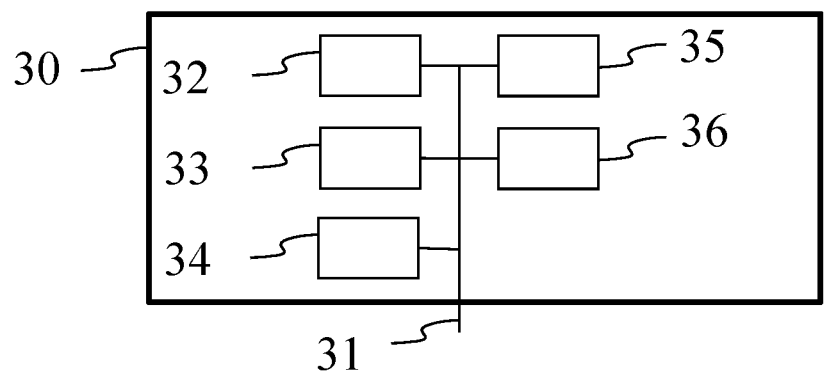
FIG. 3 shows an example architecture of a device which may be configured to implement a method described in relation with FIG. 7, according to a non-restrictive embodiment of the present principles.
Figure 7:
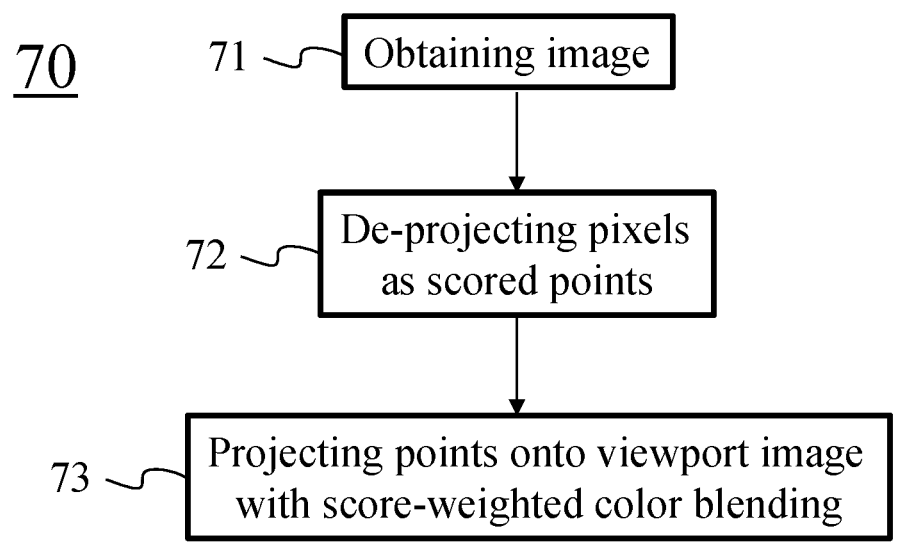
FIG. 7 diagrammatically shows a method 70 for generating an image, for example a viewport image, from a source image encoding a projection of a part of a three-dimensional scene, according to a non-restrictive embodiment of the present principles.

FIG. 3 shows an example architecture of a device 30 which may be configured to implement a method described in relation with FIG. 7. Encoder 21 and/or decoder 23 of FIG. 2 may implement this architecture. Alternatively, each circuit of encoder 21 and/or decoder 23 may be a device according to the architecture of FIG. 3, linked together, for instance, via their bus 31 and/or via I/O interface 36.

Device 30 comprises following elements that are linked together by a data and address bus 31:
- a microprocessor 32 (or CPU), which is, for example, a DSP (or Digital Signal Processor);
- a ROM (or Read Only Memory) 33;
- a RAM (or Random Access Memory) 34;
- a storage interface 35;
- an I/O interface 36 for reception of data to transmit, from an application; and
- a power supply, e.g. a battery.

In accordance with an example, the power supply is external to the device. In each of mentioned memory, the word «register» used in the specification may correspond to area of small capacity (some bits) or to very large area (e.g. a whole program or large amount of received or decoded data). The ROM 33 comprises at least a program and parameters. The ROM 33 may store algorithms and instructions to perform techniques in accordance with present principles. When switched on, the CPU 32 uploads the program in the RAM and executes the corresponding instructions.

The RAM 34 comprises, in a register, the program executed by the CPU 32 and uploaded after switch-on of the device 30, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with examples, the device 30 is configured to implement a method described in relation with FIG. 7, and belongs to a set comprising:
- a mobile device;
- a communication device;
- a game device;
- a tablet (or tablet computer);
- a laptop;
- a still picture camera;
- a video camera;
- an encoding chip;
- a server (e.g. a broadcast server, a video-on-demand server or a web server).

Figure 4:
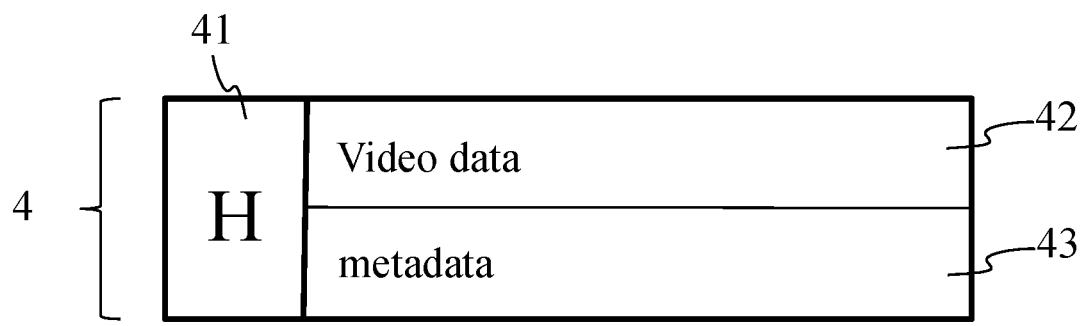
FIG. 4 shows an example of an embodiment of the syntax of a stream when the data are transmitted over a packet-based transmission protocol, according to a non-restrictive embodiment of the present principles.

FIG. 4 shows an example of an embodiment of the syntax of a stream when the data are transmitted over a packet-based transmission protocol. FIG. 4 shows an example structure 4 of a volumetric video stream. The structure consists in a container which organizes the stream in independent elements of syntax. The structure may comprise a header part 41 which is a set of data common to every syntax elements of the stream. For example, the header part comprises some of metadata about syntax elements, describing the nature and the role of each of them. The header part may also comprise a part of metadata 212 of FIG. 2, for instance the coordinates of a central point of view used for projecting points of a 3D scene onto frames 2111 and 2112. The structure comprises a payload comprising an element of syntax 42 and at least one element of syntax 43. Syntax element 42 comprises data representative of the color and depth frames. Images may have been compressed according to a video compression method.

Element of syntax 43 is a part of the payload of the data stream and may comprise metadata about how frames of element of syntax 42 are encoded, for instance parameters used for projecting and packing points of a 3D scene onto frames. Such metadata may be associated with each frame of the video or to group of frames (also known as Group of Pictures (GoP) in video compression standards).

Figure 5:
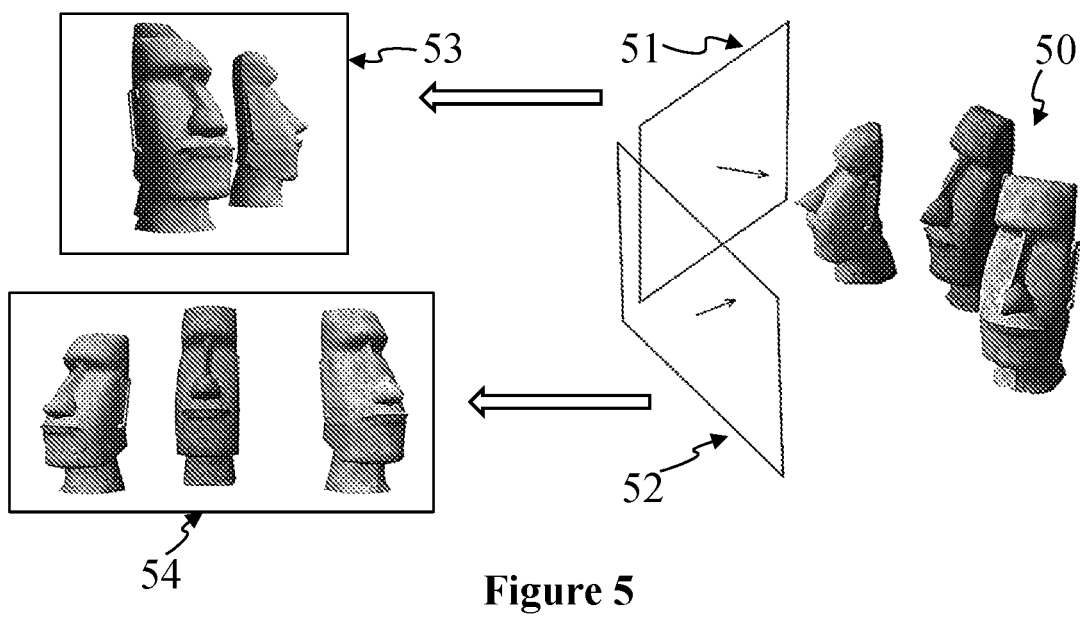
FIG. 5 illustrates the projection of a 3D model representing several 3D objects onto a first image corresponding to a first projection surface and onto a second image corresponding to a second projection surface, according to a non-restrictive embodiment of the present principles.

FIG. 5 illustrates the projection of a 3D model 50 representing several 3D objects onto a first surface 51 to obtain a first image 53 and onto a second surface 52 to obtain a second image 54. For the sake of clarity, surfaces 51 and 52 are flat rectangles associated with an orthogonal projection mapping. Projection surfaces may be of any shape and associated with a corresponding projection mapping. For instance, a projection surface may be a spherical cap associated with a spherical projection mapping such as an equirectangular projection mapping or a longitude-latitude projection mapping. In the example of FIG. 5, 3D point cloud 50 comprises three textured (i.e. colored) Moai statues. Pixels of images 53 and 54 stores depth and color information, for example in RGB-D format. In FIG. 5, for the sake of clarity, only the color information is illustrated. In another embodiment, depth and color are stored in a pair of images, one for color information, for example in RGB or YUV format and one for the depth information, for example as a grey level image. The present principles apply to this embodiment without loss of generality.

A first part of the points of the point cloud is projected onto surface 51 to obtain image 53 also called the first image. A second part of the points of the point cloud is projected onto surface 52 to obtain image 54 also called the second image. First and second parts have points in common, the second part comprises points which do not belong to the first part and the union of first and second parts may not contain the entire point cloud. The encoding of the union of first and second parts may be sufficient for a rendering in which the viewer may observe the 3D model only from a restricted volume of points of view (also called 3DoF+ rendering scenario). If the end-user is not allowed to observe the back of the statues, there is no reason to encode these points. In a six degrees of freedom rendering scenario (also called 6DoF) in which the viewer is allowed to observe the encoded 3D scene 30 from every angle of view, more projection images would be necessary, otherwise, parts of the model would be missing.

As illustrated in FIG. 2, images 53 and 54, representative of a part of the 3D scene, are encoded, compressed and transmitted to a decoder. The decoder receives images 53 and 54 associated with data describing conditions and parameters of projection 51 and 52 (e.g. parametric surfaces and mapping format). Images 53 and 54 are de-projected according to these data. In the example of FIG. 5, pixels of image 53 are mapped on surface 51 and points of the 3D scene under reconstruction are generated by orthogonally de-projecting pixels at a distance corresponding to the depth attribute of the pixels of image 53. The color attribute of a pixel is attributed to the point generated from this pixel. The same operation is performed for image 54, and, the part of the original 3D scene encoded via the two images 53 and 54 is re-built.

At the decoder, once the 3D scene is rebuilt, a viewport image is captured, for instance by a virtual camera. In a 3DoF+ scenario, the camera may be displaced by the user, for example by a user wearing a head mounted display device, the inertial measurement unit of the HMD controlling the location and orientation of the virtual camera. The rebuilt 3D scene is rendered by projecting onto the plane of the viewport image, for example using a pine-hole projection. In the example of FIG. 5, the 3DoF+ space within which the virtual camera may move would typically be located between the two centers of surfaces 51 and 52.

Due to the nature of the video codecs (e.g. HEVC codecs), a global low-pass filtering may occur on both color and depth attributes of compressed images after compression (especially at low bit rates) which cause undesired smoothing of the color and depth atlas after decoding. Color and depth values of decoded images are lightly modified. So, 3D points de-projected from pixels of such an image are not at the same place and/or not of the same color than the corresponding point in the original 3D scene. Such defects occur as soon as a strong gradient is present in the color and/or depth attribute of an image. The concerned pixel values are then very sensitive to low pass filtering and after coding, artificial intermediate values are produced which cause undesired anti-aliasing effect around contours. Such artifacts are especially critical on a transition between a foreground and a background object of the 3D scene. The antialiasing that occurs around the color and/or depth contours tends to associate a foreground color to the background and/or a background color to the foreground. These artifacts create a ghosting effect, particularly visible when the location and/or the orientation of the virtual camera captures dis-occluded parts of the 3D scene, that is when points seen from the virtual camera point of view (i.e. projected on the viewport image) have been de-projected from several source images.

Figure 6:
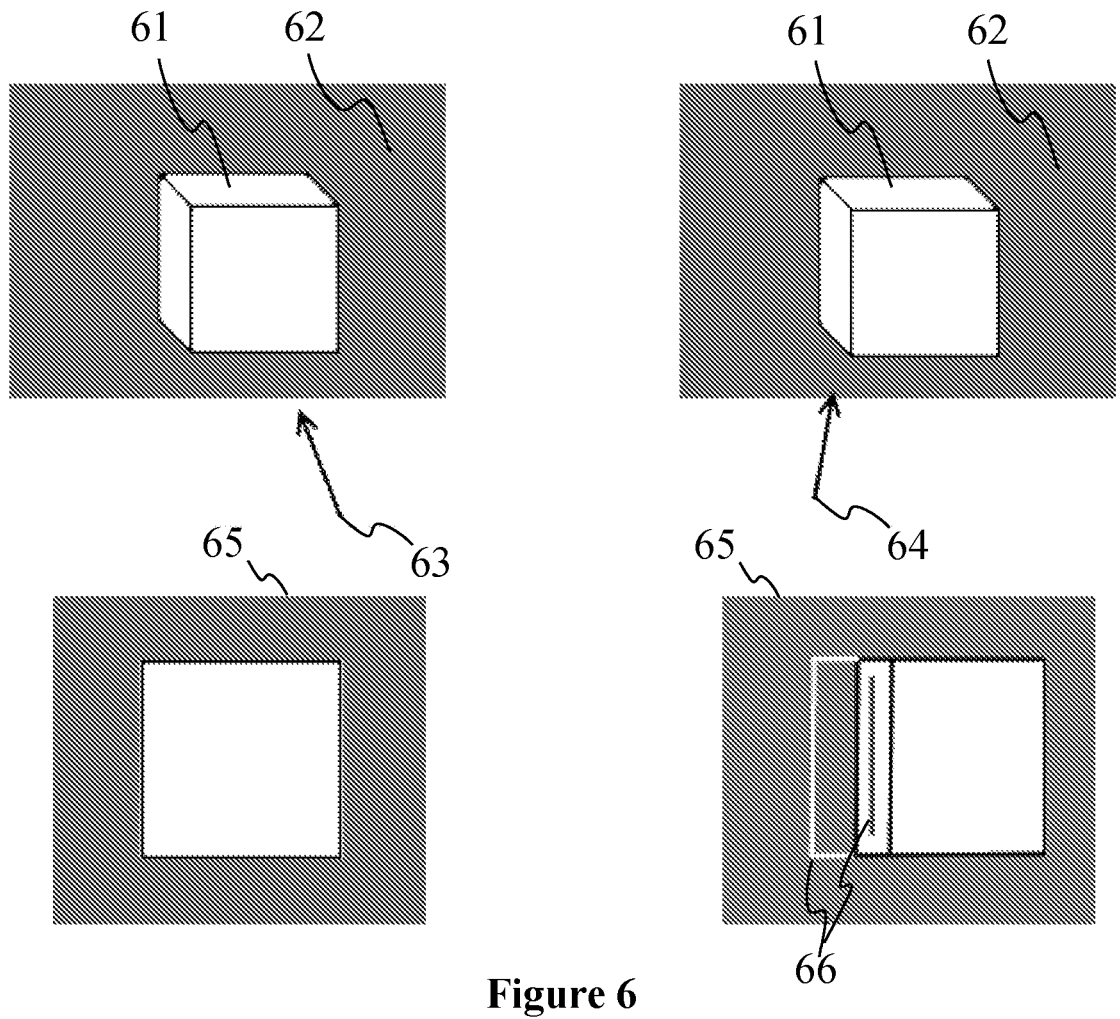
FIG. 6 illustrates the ghosting effect due to the compression of the images encoding a 3D scene, according to a non-restrictive embodiment of the present principles.

FIG. 6 illustrates the ghosting effect due to the compression of the images encoding a 3D scene. In the example of FIG. 6, a point cloud is re-built by de-projecting a set of images representative of projection of parts of an original 3D scene comprising a light-colored cube in front of a dark-colored background. As these images are rasterized, quantized and compressed, the de-projecting of their pixels comprises imprecision and error. Points of the re-built 3D scene may be at a different position and/or of a different color than the corresponding original point. When the virtual camera capturing the scene for rendering in in the viewport image of the display device, is in a location and orientation 63, close to the projection (e.g. like arrows of surfaces 51 and 52 of FIG. 5), the ghost effect resembles to the aliasing effect as illustrated on the corresponding viewport image 65. However, when the camera is at a position and/or in an orientation from which it captures points generated from several images like point of view 64, the errors in location and color of the points generate a visible artifact called the ghosting effect 66, like illustrated on viewport image 65 corresponding to point of view 64. Such artifacts are especially critical on a transition between a foreground and a background objects. The antialiasing that occurs around the color and/or depth contours tends to associate a foreground color to the background and/or a background color to the foreground. It produces ghost remaining contours of a foreground object on a background dis-occluded part and reciprocally.

FIG. 7 diagrammatically shows a method 70 for generating an image, for example a viewport image, from a source image encoding a projection of a part of a three-dimensional scene. At a step 71, the image is obtained from a source as described in relation to FIGS. 2 and 3. Method 70 produces a technical effect of reducing the ghost effect even if there is only one source image. As it uses the redundancy of information, the more the source images, the more efficient the method. Source images may be encapsulated in a data stream and associated in that stream with data representative of the projection used to generate the image. In a variant, these data are known by the decoder, that is stored in a memory accessible by the decoder. In another variant, these data are obtained from a source different from the source of the source images. Source images have a depth and a color attributes. In another embodiment, depth and color are encoded in a pair of source images, one for the depth and one for the color.

At a step 72, pixels of a source image are de-projected according to data associated to the image. A pixel of a source image is de-projected as a point at a distance relative to the depth attribute of the pixel and get the color attribute of the pixel. The generated point may have other attributes from the pixel such as a normal vector or a luminance attribute. According to the present principles, the generated point has a score attribute determined according to the local depth and/or color gradient of the pixel. As each source image is generated by the mean of various projections (with different centers and/or parametric surfaces), it is likely that a redundant part of the original 3D scene, and especially a contour, is projected on a first source image with a grazing incidence angle and on second source image with a more orthogonal incidence angle. In this latter case, the depth gradients and the color gradients are lower. Computing the local gradient of an attribute of a pixel is a well-known calculus. The local depth gradient is computed, for instance for a N×M rectangle (or square, i.e. N=M) area of pixels around the considered pixel. In a variant, the gradient is computed for an elliptic area centered on the considered pixel. According to the present principles, the depth and the color gradients of a pixel to be de-projected are computed and the score is determined as a function of these two gradients, the lower the depth and/or color gradients of the pixel, the higher the score attributed to the generated point. For example, the score is determined following equation eq1 where a and b are constant coefficients:

$$\text{score (point }(p)) = \frac{a}{\nabla depth(p)} + \frac{b}{\nabla color(p)} \quad [\text{eq1}]$$

At a step 73, an image is generated for a rendering of the decoded colored point cloud onto the viewport of a display device according to the location and the orientation of a virtual camera in the 3D space of the point cloud. For example, the projection used for the generation of the viewport image is a pine-hole projection. Other projections may be used, like a fish eye projection, an equirectangular projection or a cube mapping projection. According to the present principles, the color attributed to a pixel is a blending of the color of the 3D points projected onto this pixel, the blending being weighted by the scores of these 3D points as determined at step 72. For example, the color of the generated point is determined following equation eq2.

$$\text{color } (p(\{point\})) = \frac{\sum_{\{point\}} (\text{score (point)} * \text{color (point)})}{\sum_{\{point\}} \text{score (point)}} \quad [eq2]$$

In another embodiment, the color attributed to a pixel is the color of the 3D point projected onto this pixel having the highest score as determined at step 72.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
   de-projecting pixels of a source image as a colored point cloud, the pixels of said source image comprising a depth attribute and a color attribute, the pixels being de-projected as points having the color attribute of the respective pixel and having a score attributed according to at least one of a local depth gradient and a local color gradient of said respective pixel, wherein a lower gradient resulrs in a higher score; and
   projecting said colored point cloud to generate an image and blending the color attributes of the points projected on a same pixel, said blending being weighted by the score of said points.

2. The method according to claim 1, further comprising decoding said source image from a data stream.

3. The method according to claim 2, further comprising:
   decoding from said data stream, data representative of a mode of projection used to generate the source image, wherein the
   de-projecting pixels of the source image as a colored point cloud is based in the data representative of a mode of projection.

4. The method according to claim 1, wherein said generated image is a viewport image rendered according to a location and an orientation of a virtual camera in a 3D space.

5. The method according to claim 4, wherein said location and orientation of the virtual camera is controlled by sensors of a head-mounted display device.

6. A device comprising a processor configured for:
- de-projecting pixels of a source image as a colored point cloud, the pixels of said source image comprising a depth attribute and a color attribute, the pixels being de-projected as points having the color attribute of the respective pixel and having a score attributed according to at least one of a local depth gradient and a local color gradient of said respective pixel, wherein a lower gradient results in a higher score; and
- projecting said colored point cloud to generate an image and blending the color attributes of the points projected on a same pixel, said blending being weighted by the score of said points.

7. The device according to claim 6, wherein the processor is configured for decoding said source image from a data stream.

8. The device according to claim 7, wherein the processor is configured for:
- decoding from said data stream, data representative of a mode of projection used to generate the source image, wherein the
- de-projecting pixels of the source image as a colored point cloud is based in the data representative of a mode of projection.

9. The device according to claim 6, wherein said generated image is a viewport image rendered according to a location and an orientation of a virtual camera in a 3D space.

10. The device according to claim 9, wherein said location and orientation of the virtual camera is controlled by sensors of a head-mounted display device.

11. A non-transitory processor readable medium having stored therein instructions for causing a processor to perform a method comprising:
- de-projecting pixels of a score image as a colored point cloud, the pixels of said source image comprising a depth attribute and a color attribute, the pixels being de-projected as points having the color attribute of the respective pixel and having a score attributed according to at least one of a local depth gradient and a local color gradient of said respective pixel, wherein a lower gradient results in a higher score; and
- projecting said color point cloud to generate an image and blending the color attributes of the points projected on a same pixel, sai blending being weighted by the score of said points.

12. The method according to claim 1, wherein the color of a pixel of the generated image is the color of the point projected on the pixel having the highest score.

13. The method according to claim 1, wherein the score of a point is a weighted sum of an inverse of the depth gradient and an inverse of the local color gradient of the de-projected pixel.

14. The device according to claim 6, wherein the processor is configured to determine the color of a pixel of the generated image as the color of the point projected on the pixel having the highest score.

15. The device according to claim 6, wherein the score of a point is a weighted sum of an inverse of the depth gradient and an inverse of the local color gradient of the de-projected pixel.

* * * * *